US010316569B2

(12) United States Patent
Kim et al.

(10) Patent No.: US 10,316,569 B2
(45) Date of Patent: Jun. 11, 2019

(54) STRUCTURE FOR UNIFYING MOTOR FOR USE WITH REAR CURTAIN AND POWER TRUNK

(71) Applicant: Hyundai Motor Company, Seoul (KR)

(72) Inventors: Duck-Young Kim, Gyeonggi-do (KR); Yong-Hyuck Im, Seoul (KR)

(73) Assignee: Hyundai Motor Company, Seoul (KR)

( * ) Notice: Subject to any disclaimer, the term of this patent is extended or adjusted under 35 U.S.C. 154(b) by 499 days.

(21) Appl. No.: 15/137,373

(22) Filed: Apr. 25, 2016

(65) Prior Publication Data
US 2017/0122022 A1 May 4, 2017

(30) Foreign Application Priority Data
Oct. 28, 2015 (KR) .................. 10-2015-0149886

(51) Int. Cl.
| F16D 27/09 | (2006.01) |
|---|---|
| E05F 15/627 | (2015.01) |
| B60J 1/00 | (2006.01) |
| B60J 5/10 | (2006.01) |
| F16D 27/14 | (2006.01) |
| F16H 19/06 | (2006.01) |
| F16H 19/08 | (2006.01) |
| B60J 1/20 | (2006.01) |

(Continued)

(52) U.S. Cl.
CPC .............. *E05F 15/627* (2015.01); *B60J 1/003* (2013.01); *B60J 1/2019* (2013.01); *B60J 5/101* (2013.01); *B60J 5/107* (2013.01); *E05F 15/643* (2015.01); *F16D 27/09* (2013.01); *F16D 27/14* (2013.01); *F16H 19/06* (2013.01); *F16H 19/08* (2013.01); *E05Y 2900/548* (2013.01); *F16D 2121/20* (2013.01); *F16D 2121/24* (2013.01); *F16D 2125/52* (2013.01); *F16H 2019/085* (2013.01)

(58) Field of Classification Search
CPC ....... E05F 15/627; E05F 15/643; B60J 5/107; F16D 27/14; F16H 19/08
See application file for complete search history.

(56) References Cited

U.S. PATENT DOCUMENTS 5,360,254 A * 11/1994 Sorimachi ................. B60J 7/04
                                                            296/218
7,137,174 B2 * 11/2006 Derbis .................... E05D 3/145
                                                            16/289

(Continued)

FOREIGN PATENT DOCUMENTS

| JP | 2001-0039157 | 2/2001 |
|---|---|---|
| KR | 10-083475 | 12/2008 |

(Continued)

*Primary Examiner* — David M Fenstermacher
(74) *Attorney, Agent, or Firm* — Mintz Levin Cohn Ferris Glovsky and Popeo, P.C.; Peter F. Corless

(57) ABSTRACT

A structure for unifying a motor for use with a rear curtain and a power trunk is provided. The structure includes an electromagnetic clutch, which is connected to a hinge arm of a trunk lid via a trunk wire and is connected to a rear curtain via a curtain wire and selectively transmits driving force to the trunk wire or to the curtain wire. Additionally, a rotary motor is connected to the electromagnetic clutch and supplies driving force to the electromagnetic clutch. The trunk wire and the curtain wire are operated by a single rotary motor. Accordingly, the production cost and weight of a vehicle are reduced.

7 Claims, 7 Drawing Sheets

(51) Int. Cl.
*E05F 15/643* (2015.01)
*F16D 121/20* (2012.01)
*F16D 121/24* (2012.01)
*F16D 125/52* (2012.01)

(56) References Cited

U.S. PATENT DOCUMENTS

| | | | | |
|---|---|---|---|---|
| 7,140,150 B2* | 11/2006 | Sakai | ............... | E05F 15/603 |
| | | | | 49/340 |
| 7,396,067 B2 | 7/2008 | Thumm et al. | | |
| 7,726,455 B2* | 6/2010 | Benoit | ............... | E05F 15/611 |
| | | | | 192/114 R |
| 7,810,280 B2* | 10/2010 | Hattori | ............... | E05F 15/63 |
| | | | | 49/340 |
| 7,866,728 B2* | 1/2011 | Suzuki | ............... | E05F 15/70 |
| | | | | 296/146.4 |
| 7,959,204 B2* | 6/2011 | Yoshida | ............... | E05F 15/63 |
| | | | | 296/56 |
| 8,256,161 B2* | 9/2012 | Nagai | ............... | E05F 15/646 |
| | | | | 49/360 |
| 8,479,445 B2* | 7/2013 | Ichinose | ............... | E05F 15/63 |
| | | | | 49/340 |
| 8,562,034 B2* | 10/2013 | Hirota | ............... | H02H 7/0851 |
| | | | | 292/1 |
| 8,975,850 B2* | 3/2015 | Hirota | ............... | H02K 7/14 |
| | | | | 318/266 |

FOREIGN PATENT DOCUMENTS

| | | |
|---|---|---|
| KR | 10-2010-0043319 | 4/2010 |
| KR | 10-2013-0032757 A | 4/2013 |
| KR | 10-1282680 B1 | 7/2013 |

* cited by examiner

STRUCTURE FOR UNIFYING MOTOR FOR USE WITH REAR CURTAIN AND POWER TRUNK

CROSS-REFERENCE TO RELATED APPLICATION

This application claims the priority benefit of Korean Patent Application No. 10-2015-0149886, filed on Oct. 28, 2015 in the Korean Intellectual Property Office, the disclosure of which is incorporated herein by reference.

BACKGROUND

1. Field of the Invention

The present invention relates to a structure for driving a rear curtain and a power trunk, and more particularly to a structure for unifying a motor for use with a rear curtain and a power trunk, which is able to selectively drive a rear curtain or a power trunk using a single motor and an electromagnetic clutch, thereby reducing the production cost and weight of a vehicle and improving the ease of assembly and marketability of a power trunk.

2. Description of the Related Art

In general, a vehicle includes a rear glass to secure a driver's rear vision and passenger comfort. However, when a substantial amount of direct sunlight passes through the rear glass, the interior temperature of the vehicle increases and passengers are subjected to glare. In addition, the rear glass is equipped with a rear curtain to protect passengers' privacy and block the sunlight. A rear curtain is classified into a motor-operated type, which is driven by a motor and button manipulation, and a hand-operated type, which is manually raised by a passenger and is locked on a hook mounted to the upper frame of a door.

Meanwhile, a trunk room is generally located at the rear of a vehicle, and may contain and store various items such as luggage, emergency repair tools, a spare tire, a first-aid kit for use in traffic accidents, etc., and a trunk lid is provided to cover the trunk room. The trunk lid is locked or unlocked by a trunk locking mechanism, and is equipped with a hinge device, by which the trunk lid may be lifted up with a minimal force when unlocked by the trunk locking mechanism. Recently, a power trunk has been developed that may be automatically opened and closed by an electric motor when a driver manipulates a switch while sitting in the driver's seat, and the application thereof is gradually increasing due to the development of luxury vehicles having extra features.

FIG. 1 is a view schematically illustrating the rear portion of a vehicle equipped with a conventional motor-operated rear curtain device and power trunk device according to the related art. As shown in FIG. 1, a conventional motor-operated rear curtain device includes a curtain motor 12 connected to and driven by the electric power supply of the vehicle, and a rear curtain 10 made of fabric and connected to the curtain motor via a curtain wire 14 to be raised and lowered.

A conventional power trunk device includes a trunk motor 22 mounted to the rear portion of the body of the vehicle, and a driving unit 24 connected to the trunk motor and including a plate, a gas lifter, gears, a link mechanism, etc. to open and close a trunk lid 20 provided at the rear of the vehicle. However, the conventional rear curtain device and the conventional power trunk device are independent systems that are driven separately by the curtain motor 12 and the trunk motor 22, which increases the production cost and weight of the vehicle. Further, the conventional power trunk device has problems in that the process of assembling the driving unit is complex and the opening and closing performance is deteriorated due to the gas lifter not firmly supporting the trunk lid in a variety of environmental temperatures.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a structure for unifying a motor for use with a rear curtain and a power trunk, which is capable of selectively driving a rear curtain or a power trunk using a single rotary motor, thereby reducing the production cost and weight of a vehicle.

It is another object of the present invention to provide a structure for unifying a motor for use with a rear curtain and a power trunk having a simplified assembly process by replacing a conventional driving unit with a structure in which a trunk lid is opened and closed using a trunk wire and remains firm despite variations in temperature by eliminating a conventional gas lifter. However, objects to be accomplished by the invention are not limited to the above-mentioned objects, and other objects not mentioned will be clearly understood by those skilled in the art from the following description.

In accordance with an aspect of the present invention, the above and other objects may be accomplished by the provision of a structure for unifying a motor for use with a rear curtain and a power trunk, the structure may include an electromagnetic clutch connected to a hinge arm of a trunk lid via a trunk wire and connected to a rear curtain via a curtain wire, the electromagnetic clutch may be configured to selectively transmit driving force to the trunk wire or to the curtain wire, and a rotary motor connected to the electromagnetic clutch, the rotary motor may be configured to supply driving force to the electromagnetic clutch, and the trunk wire and the curtain wire being operated by the rotary motor. The structure may further include a coil spring having a first end connected to a body of a vehicle and a second end connected to the hinge arm of the trunk lid, the hinge arm of the trunk lid being rotated upwards by compression of the coil spring.

The electromagnetic clutch may include a clutch gear connected to and rotated by a driving shaft of the rotary motor, the clutch gear being movable vertically, a trunk gear disposed above the clutch gear and connected to the trunk wire to transmit driving force to the trunk wire, and a rear curtain gear disposed below the clutch gear and connected to the curtain wire to transmit driving force to the curtain wire, the trunk gear being rotated by upward movement of the clutch gear and the rear curtain gear being rotated by downward movement of the clutch gear.

The clutch gear may be made of a metal material, and the electromagnetic clutch may further include an electromagnet disposed above the trunk gear. The electromagnet may be configured to pull the clutch gear toward the trunk gear when electric current is applied to the electromagnet. The electromagnetic clutch may further include an elastic member interposed between the clutch gear and the trunk gear and configured to press the clutch gear downwards.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
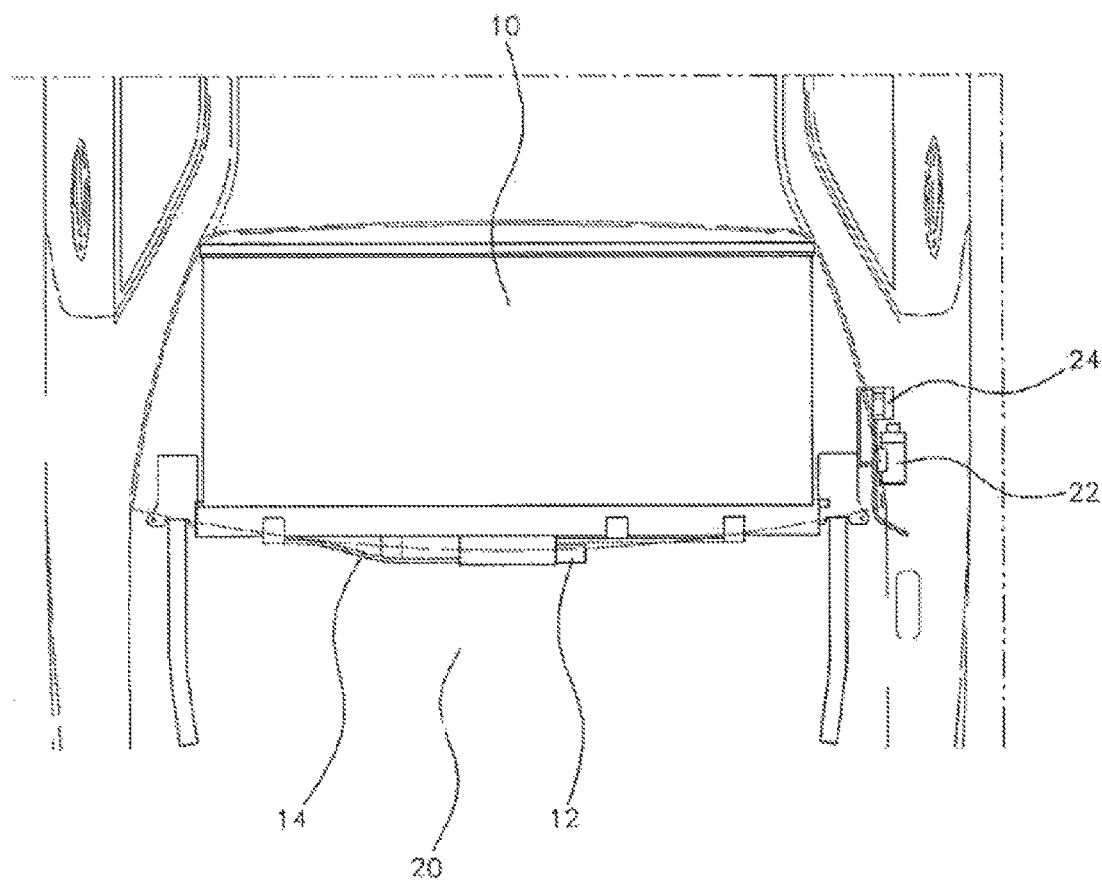
FIG. 1 is a view schematically illustrating the rear portion of a vehicle equipped with a conventional motor-operated rear curtain device and power trunk device according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The exemplary embodiments described in the following specification and shown in the accompanying drawings are illustrative only and are not intended to represent all aspects of the invention, so that it is to be understood that various equivalents and modifications may be made without departing from the spirit of the invention.

In the drawings, the same or similar elements are denoted by the same reference numerals even though they are depicted in different drawings. In the following description of the present invention, a detailed description of known functions and configurations incorporated herein will be omitted when it may obscure the subject matter of the present invention. It is to be understood that the phraseology and terminology used in the following specification and appended claims should not be construed as limited to general and dictionary meanings but be construed as the meanings and concepts according to the spirit of the present invention on the basis of the principle that the inventor is permitted to define appropriate terms for the best explanation.

Figure 2:
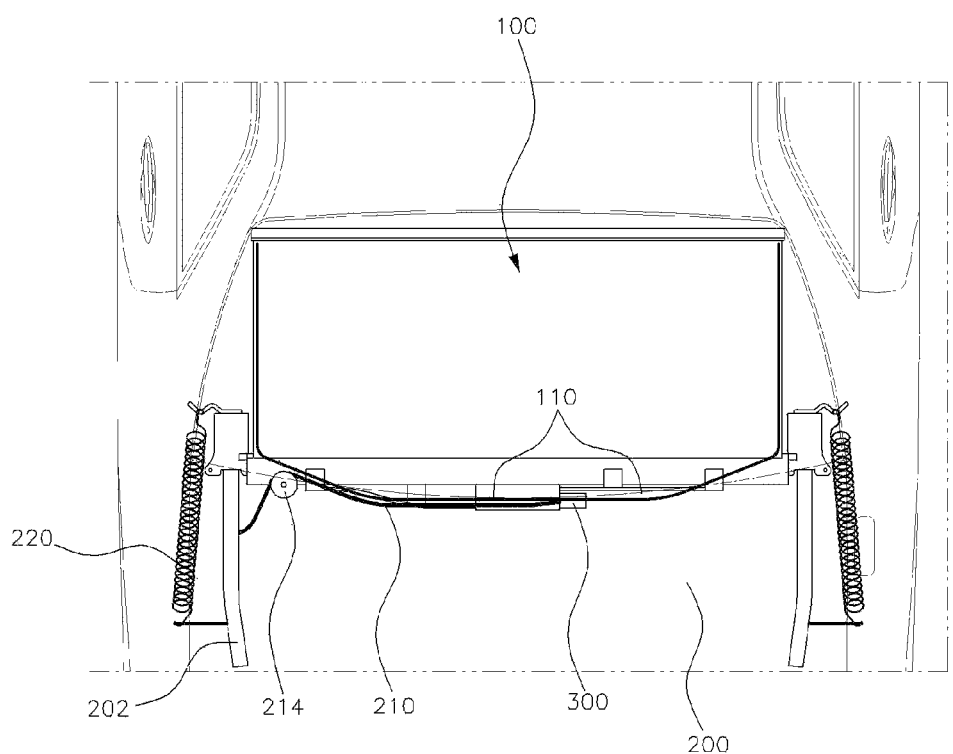
FIG. 2 is a view schematically illustrating the rear portion of a vehicle equipped with a structure for unifying a motor for use with a rear curtain and a power trunk according to an exemplary embodiment of the present invention.
Figure 3:
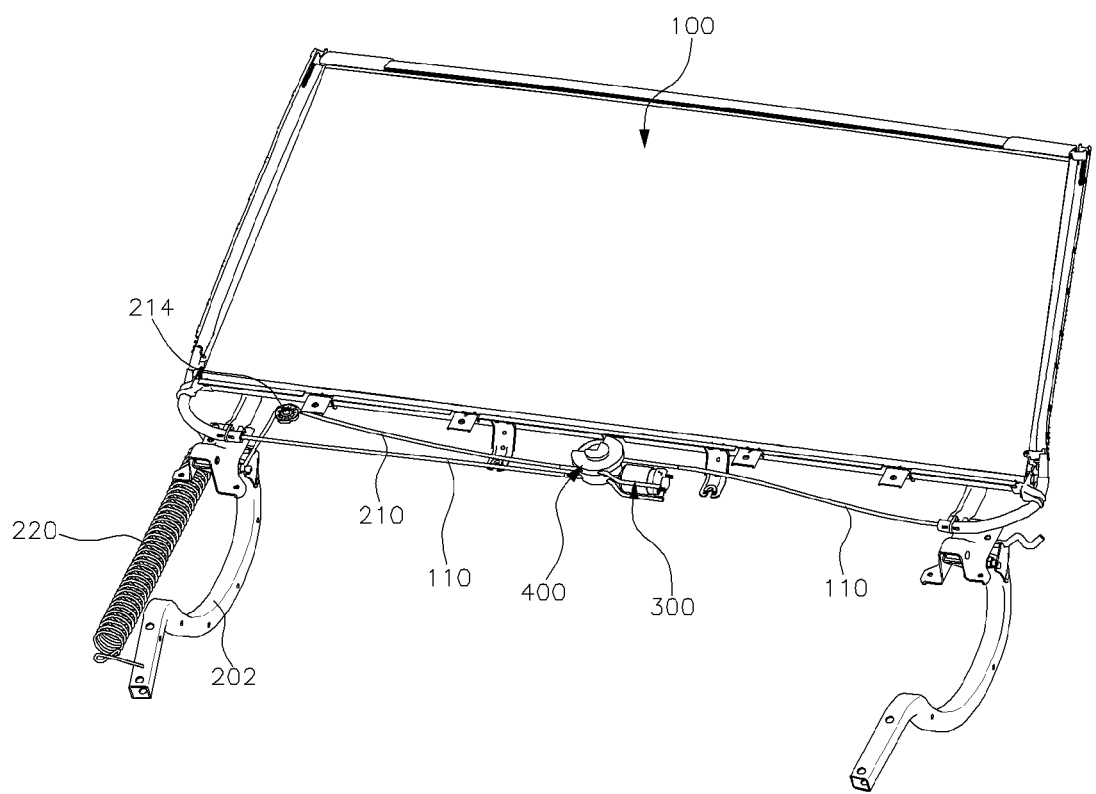
FIG. 3 is a view illustrating a structure for unifying a motor for use with a rear curtain and a power trunk according to an exemplary embodiment of the present invention.

FIG. 2 is a view schematically illustrating the rear portion of a vehicle equipped with a structure for unifying a motor for use with a rear curtain and a power trunk according to an exemplary embodiment of the present invention, and FIG. 3 is a view illustrating a structure for unifying a motor for use with a rear curtain and a power trunk according to an exemplary embodiment of the present invention.

As shown in the drawings, a structure for unifying (e.g., integrating) a motor for use with a rear curtain and a power trunk according to the present invention may include an electromagnetic clutch 400, connected to a hinge arm 202 of a trunk lid 200 via a trunk wire 210 and connected to a rear curtain 100 via a curtain wire 110 and configured to selectively transmit driving force to the trunk wire 210 or the curtain wire 110, and a rotary motor 300, connected to the electromagnetic clutch 400 and configured to supply driving force to the electromagnetic clutch 400.

The trunk wire 210 may include a first end connected to the hinge arm 202 of the trunk lid and a second end connected to the electromagnetic clutch 400, and may be configured to pull the hinge arm 202. A pulley 214, over which the middle portion of the trunk wire 210 runs, may be provided to support the movement and change of direction of the trunk wire 210. The curtain wire 110 may include a first end connected to the rear curtain 100 and a second end connected to the electromagnetic clutch 400, and may be configured to move the rear curtain 100 vertically. In this exemplary embodiment, two curtain wires 110 may be provided that extend in opposite directions from the electromagnetic clutch 400.

The rotary motor 300 may be connected to a portion of the electromagnetic clutch 400, and may be configured to supply driving force to the electromagnetic clutch 400. The driving force of the rotary motor 300 may be transmitted either to the trunk wire 210 or to the curtain wire 110 via the electromagnetic clutch 400. Additionally, the structure for unifying a motor for use with the rear curtain and the power trunk according to the present invention may further include a coil spring 220, having a first end connected to the body of the vehicle and a second end connected to the hinge arm 202 of the trunk lid 200. The coil spring 220 may be compressed to rotate the hinge arm 202 of the trunk lid 200 upwards.

In other words, as shown in FIG. 3, the rear end of the hinge arm 202 may be connected to the coil spring 220, and thus, when a driver releases the locking mechanism, the hinge arm 202 may be rotated upwards to open the trunk lid. The front end of the hinge arm 202 may be connected to the trunk wire 210, and thus when the trunk wire 210 is pulled, the hinge arm 202 may be rotated downwards to close the trunk lid. The internal constitution of the electromagnetic clutch 400 will now be described.

Figure 4:
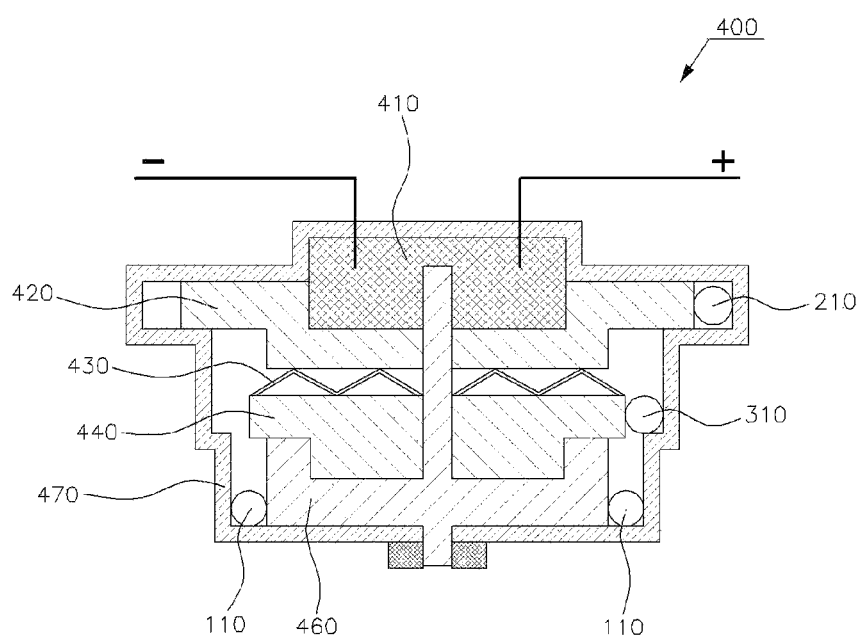
FIG. 4 is a view schematically illustrating the components of an electromagnetic clutch according to an exemplary embodiment of the present invention.
Figure 5:
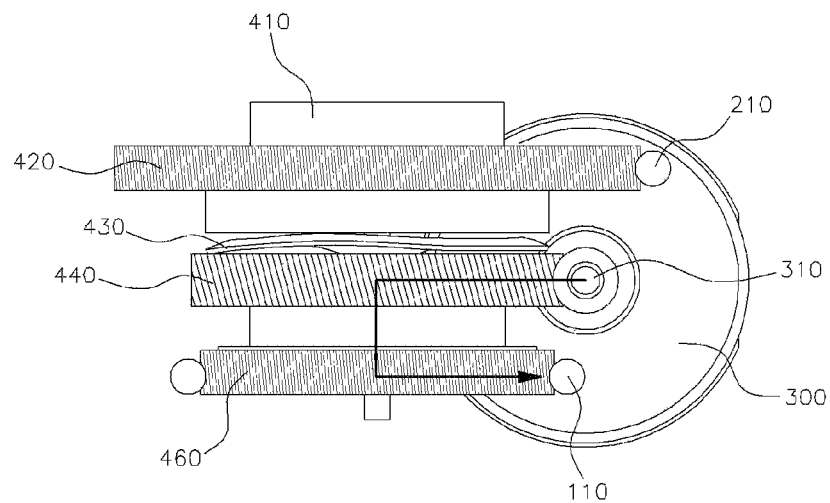
FIG. 5 is a view illustrating the components of an electromagnetic clutch when a rear curtain according to an exemplary embodiment of the present invention is operated.
Figure 6:
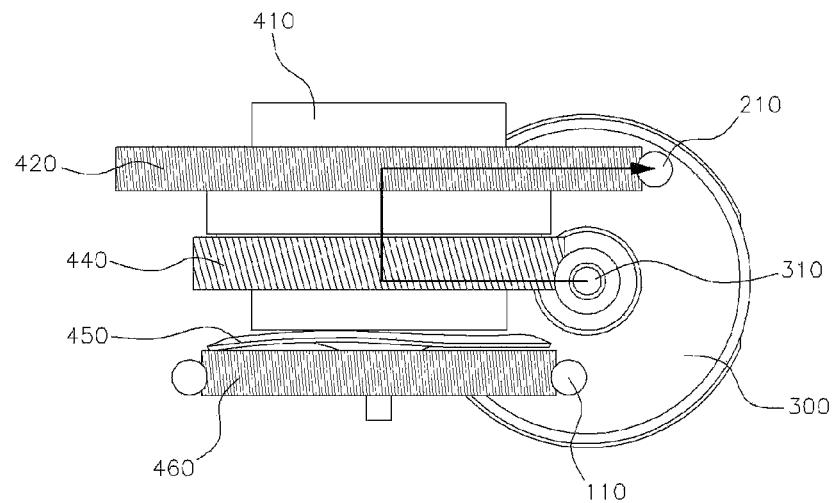
FIG. 6 is a view illustrating the components of an electromagnetic clutch when a trunk lid according to an exemplary embodiment of the present invention is operated.
Figure 7:
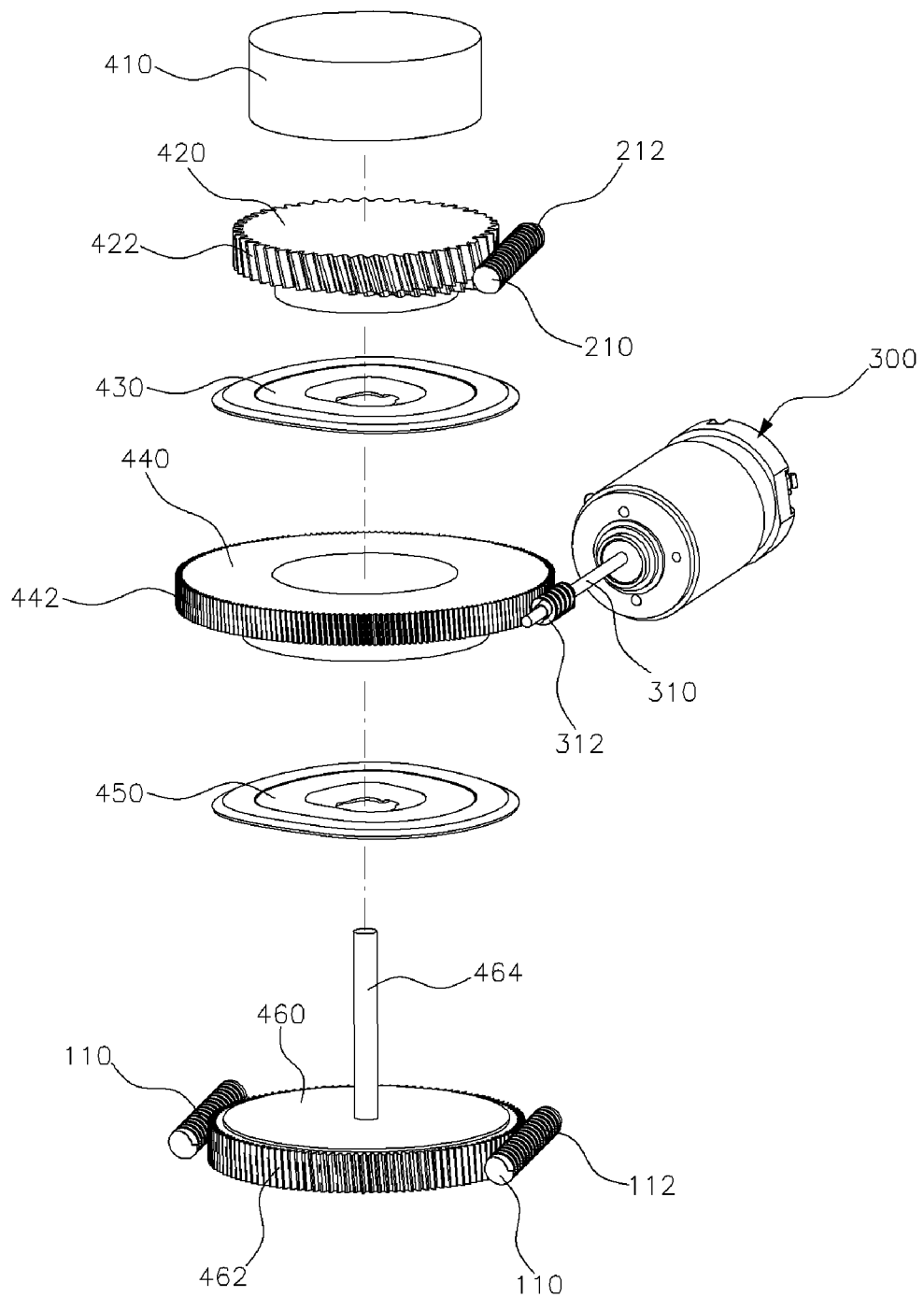
FIG. 7 is a view illustrating the state in which the components of an electromagnetic clutch according to an exemplary embodiment of the present invention are disassembled.

FIG. 4 is a view schematically illustrating the components of the electromagnetic clutch according to an exemplary embodiment of the present invention, FIG. 5 is a view illustrating the components of the electromagnetic clutch when the rear curtain according to an exemplary embodiment of the present invention is operated, FIG. 6 is a view illustrating the components of the electromagnetic clutch when the trunk lid according to an exemplary embodiment of the present invention is operated, and FIG. 7 is a view illustrating the state in which the components of the electromagnetic clutch according to an exemplary embodiment of the present invention are disassembled.

As shown in the drawings, the electromagnetic clutch 400 according to the present invention may include a clutch gear 440, connected to and rotated by a driving shaft 310 of the rotary motor 300 and movable vertically, a trunk gear 420 disposed above the clutch gear 440 and connected to the trunk wire 210 to transmit driving force to the trunk wire 210, and a rear curtain gear 460 disposed below the clutch gear 440 and connected to the curtain wire 110 to transmit driving force to the curtain wire 110.

The clutch gear 440 may be formed to have a ring shape, and may include a plurality of teeth 442 formed around the circumference thereof, the teeth being meshed with screw threads 312 formed in the driving shaft 310 of the rotary motor. The axis of rotation of the clutch gear 440 and the axis of rotation of the driving shaft 310 of the rotary motor may be perpendicular to each other, and the clutch gear 440 may be rotated by the rotation of the driving shaft 310 of the rotary motor.

The trunk gear 420 disposed above the clutch gear 440 may include a plurality of teeth 422 formed around the circumference thereof, the teeth being meshed with screw threads 212 formed in the trunk wire 210. The axis of rotation of the trunk gear 420 and the axis of rotation of the trunk wire 210 may be perpendicular to each other, and the trunk wire 210 may be rotated and moved forward and backward by the rotation of the trunk gear 420.

The rear curtain gear 460 disposed below the clutch gear 440 may include a plurality of teeth 462 formed around the circumference thereof, the teeth being meshed with screw threads 112 formed in the curtain wire 110. The curtain wire 110 may be rotated and moved forward and backward by the rotation of the rear curtain gear 460. In other words, the driving force of the rotary motor 300 may be transmitted to the trunk wire 210 or the curtain wire 110 via the clutch gear 440, the trunk gear 420 and the rear curtain gear 460, which have the teeth 442, 422 and 462 formed along their circumferences. Additionally, the clutch gear 440 may be made of a metal material (e.g. a steel material), and an electromagnet 410 may be disposed above the trunk gear 420 to pull the clutch gear 440 toward the trunk gear 420 when electric current is applied to the electromagnet 410.

In the normal state, as shown in FIG. 5, the clutch gear 440 may remain at a lower position due to the weight thereof to be directly connected to the rear curtain gear 460. Accordingly, the driving force of the rotary motor 300 may be sequentially transmitted to the driving shaft 310, the clutch gear 440, the rear curtain gear 460 and the curtain wire 110, thereby moving the rear curtain 100. When electric current is applied to the electromagnet 410, as shown in FIG. 6, the clutch gear 440 is lifted up (e.g., raised) by the magnetic force of the electromagnet 410 and is directly connected to the trunk gear 420. Accordingly, the driving force of the rotary motor 300 may be sequentially transmitted to the driving shaft 310, the clutch gear 440, the trunk gear 420 and the trunk wire 210, thereby rotating the hinge arm 202. The electromagnet 410 may directly connect the clutch gear 440 and the trunk gear 420 using the magnetic field produced by the electric current applied thereto. Accordingly, the curtain wire 110 or the trunk wire 210 may be selectively moved by the single rotary motor 300.

The structure for unifying a motor for use with the rear curtain and the power trunk according to the present invention may further include an elastic member 430 interposed between the clutch gear 440 and the trunk gear 420 and configured to press the clutch gear 440 downwards. The elastic member 430 may be embodied as a wave spring. The wave spring disclosed herein may be configured as a hoop-shaped plate having a plurality of peaks and valleys forming a wave pattern along the circumferential direction thereof. As shown in FIGS. 4 and 5, the clutch gear 440 may be pressed downwards by the elastic member 430, and accordingly the rear curtain gear 460 and the clutch gear 440 may be directly connected to each other, thereby transmitting driving force to the curtain wire 110. Further, a second elastic member 450 may be interposed between the clutch gear 440 and the rear curtain gear 460. When the clutch gear 440 is moved toward the trunk gear 420, as shown in FIG. 6, the second elastic member 450 disposed below the clutch gear 440 may facilitate the upward movement of the clutch gear 440.

Similar to the elastic member 430 interposed between the clutch gear and the trunk gear, the second elastic member 450 may be embodied as a wave spring. The spring constant of the elastic member 430 may be set to be greater than that of the second elastic member 450. Accordingly, in the normal state, as shown in FIG. 5, the clutch gear 440 may be maintained at a lower position. The elastic member 430 and the second elastic member 450, configured to apply elastic force to the clutch gear 440, may also act as a friction material that generates frictional force between the clutch gear 440 and the trunk gear 420 and between the clutch gear 440 and the rear curtain gear 460.

The rear curtain gear 460, disposed at the lowermost position of the electromagnetic clutch 400, may include an extending rod 464 formed on the top surface of the rear curtain gear 460. The aforementioned components, including the clutch gear 440, the trunk gear 420 and the elastic member 430, may be fitted on the extending rod 464 and may be assembled together. All of the components of the electromagnetic clutch 400 may be contained within (e.g., enclosed by) a housing 470.

The operation of the structure for unifying a motor for use with the rear curtain and the power trunk according to the present invention will now be described with reference to FIGS. 5 and 6. As shown in FIG. 5, when the rear curtain 100 is operated, the clutch gear 440 may be connected to the rear curtain gear 460 due to the weight thereof or by the elastic member 430. Accordingly, the driving force generated from the rotary motor 300 may be sequentially transmitted to the driving shaft 310, the clutch gear 440, the rear curtain gear 460 and the curtain wire 110. As a result, a driver may open or close the rear curtain 100.

As shown in FIG. 6, when the trunk lid 200 is operated, the clutch gear 440 may be connected to the trunk gear 420 by the magnetic force of the electromagnet 410. Accordingly, the driving force generated from the rotary motor 300 may be sequentially transmitted to the driving shaft 310, the clutch gear 440, the trunk gear 420 and the trunk wire 210. As a result, the hinge arm 202 may be pulled, and the trunk lid 200 may be closed. As shown in FIGS. 2 and 3, the hinge arm 202 of the trunk lid 200 may be connected to the coil spring 220. Accordingly, when a driver releases the locking mechanism, the hinge arm 202 may be rotated upwards by the compression of the coil spring 220, thereby opening the trunk lid 200.

As described above, the rear curtain system and the power trunk system may be organically connected via the electromagnetic clutch, the curtain wire and the trunk wire, and may be operated by the single rotary motor. Accordingly, the production cost and weight of a vehicle may be reduced, and the ease of assembly and marketability of a vehicle may be improved.

As is apparent from the above description, the present invention provides a structure for unifying a motor for use with a rear curtain and a power trunk, in which the rear curtain and the power trunk may be operated by a single rotary motor and an electromagnetic clutch, thereby reducing the production cost and weight of a vehicle. In particular, a driving unit and a gas lifter, which have been used in a conventional power trunk, may be eliminated, and the rear curtain and the power trunk may be operated using a comparatively simplified structure, thereby remarkably reducing the production cost and weight of a vehicle in comparison with a conventional power trunk.

Further, since a driving unit of a conventional power trunk may be replaced by a structure whereby the trunk wire is connected to the hinge arm of the trunk lid, the ease of assembly may be improved, and accordingly the time and number of processes required to assemble a vehicle may be reduced. In addition, since the structure according to the present invention obviates various components (e.g. a gas lifter) of a conventional power trunk, it remains firm despite environmental variation and has consistent opening and closing performance, and accordingly the marketability of a vehicle may be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure for unifying a motor for use with a rear curtain and a power trunk, comprising:
   an electromagnetic clutch connected to a hinge arm of a trunk lid via a trunk wire and connected to a rear curtain via a curtain wire, wherein the electromagnetic clutch is configured to selectively transmit driving force to the trunk wire or to the curtain wire;
   a rotary motor connected to the electromagnetic clutch and configured to supply driving force to the electromagnetic clutch,
   wherein the trunk wire and the curtain wire are operated by the rotary motor; and
   a coil spring having a first end connected to a body of a vehicle and a second end connected to the hinge arm of the trunk lid,
   wherein the hinge arm of the trunk lid is rotated upwards by compression of the coil spring.

2. The structure according to claim 1, wherein the electromagnetic clutch includes:
   a clutch gear connected to and rotated by a driving shaft of the rotary motor, wherein the clutch gear is movable vertically;
   a trunk gear disposed above the clutch gear and connected to the trunk wire to transmit driving force to the trunk wire; and
   a rear curtain gear disposed below the clutch gear and connected to the curtain wire to transmit driving force to the curtain wire,
   wherein the trunk gear is rotated by upward movement of the clutch gear, and the rear curtain gear is rotated by downward movement of the clutch gear.

3. The structure according to claim 2, wherein the clutch gear is made of a metal material and the electromagnetic clutch further includes an electromagnet disposed above the trunk gear and configured to pull the clutch gear toward the trunk gear when electric current is applied to the electromagnet.

4. The structure according to claim 3, wherein the electromagnetic clutch further includes an elastic member interposed between the clutch gear and the trunk gear and configured to press the clutch gear downwards.

5. The structure according to claim 3, wherein the electromagnet directly connects the clutch gear and the trunk gear using a magnetic field produced by electric current applied thereto.

6. The structure according to claim 4, wherein the elastic member is a wave spring.

7. The structure according to claim 3, wherein an elastic member is interposed between the clutch gear and the rear curtain gear and is configured to move the clutch gear upward.

* * * * *